March 19, 1963 P. A. KREIDER 3,081,937
AUTOMOBILE TRASH DISPOSAL SYSTEM
Filed Nov. 7, 1960 2 Sheets-Sheet 1
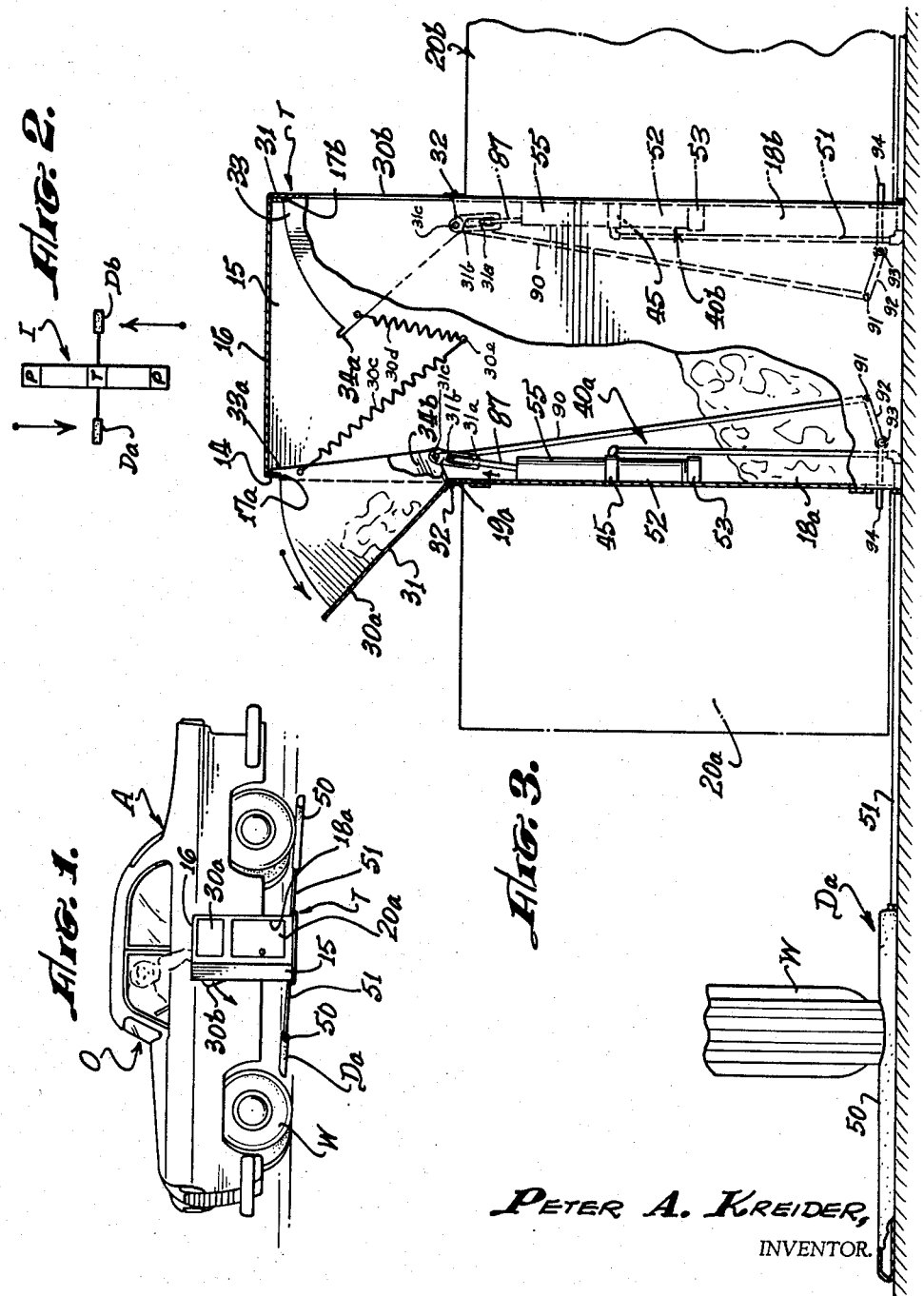
PETER A. KREIDER, INVENTOR.
BY William C. Babcock
ATTORNEY.

March 19, 1963 P. A. KREIDER 3,081,937
AUTOMOBILE TRASH DISPOSAL SYSTEM
Filed Nov. 7, 1960 2 Sheets-Sheet 2

PETER A. KREIDER,
INVENTOR.

BY
Julian C. Baberck
ATTORNEY.

United States Patent Office 3,081,937
Patented Mar. 19, 1963

3,081,937
AUTOMOBILE TRASH DISPOSAL SYSTEM
Peter A. Kreider, Whittier, Calif.
(1307 Denise Court, Brea, Calif.)
Filed Nov. 7, 1960, Ser. No. 67,757
4 Claims. (Cl. 232—43.2)

The present invention relates to a method and apparatus for disposing of trash from an automobile. This application is a continuation-in-part application of copending application Serial No. 773,052 filed November 10, 1958 by Peter A. Kreider, titled Automobile Trash Disposal System, now abandoned.

An acute problem of the automotive age is the efficient disposition of trash and debris which accumulates in automobiles, trucks, and the like. Many city dwellers now spend an appreciable portion of their lives in automobiles, and the attendant trash disposal problem has accordingly assumed substantial proportions. While the problem has been recognized, no significant steps have heretofore been taken toward the solution thereof.

According to the present invention, a method and apparatus are provided which are especially adapted for use at a service station, although their application is not necessarily restricted to that purpose. Service stations are conventionally equipped to supply gasoline, oil, water, air and other needs of automotive vehicles in a very efficient manner. Service stations are also conventionally provided with rest rooms for the convenience of those who ride in and/or drive automotive vehicles. It is therefore logical to conclude that disposal of trash from automotive vehicles could likewise be most efficiently provided for through the medium of specialized equipment constituting a standard part of each service station installation. Despite the inherent logic of the above conclusion, and despite the fact that millions of people in the United States ride in automobiles, patronize service stations, and are faced with the problem of disposing of trash from automobiles, there has been an apparent failure heretofore to recognize this solution to the problem.

In the conventional service station an island is provided on which the gasoline pumps, air hoses, water hoses and other equipment are permanently mounted. An automobile approach area is provided on each side of the island. A major object of the present invention, therefore, is to provide an improved method for disposing of trash from automobiles and trucks without alighting therefrom.

Another object of the invention is to provide a method for operating a trash disposal system as an efficient part of a conventional service station installation.

A further object of the invention is to provide a trash disposal apparatus adapted to be permanently mounted on a service station island which is capable of conveniently accepting trash directly from an occupant of an automotive vehicle from either side of the island.

Still another object of the invention is to provide a trash disposal apparatus which automatically responds to the arrival of an automotive vehicle so as to assume a trash-receiving condition.

Still a further object of the invention is to provide a trash disposal apparatus which is uniquely suited to the requirements of the occupant of an automotive vehicle, and into which he can conveniently dispose of trash without getting out of his vehicle.

Yet another object of the invention is to provide a trash container having a pair of normally closed chutes or guides on opposite sides thereof which are separately actuated in response to the approach of an automotive vehicle toward the corresponding side of the container to be temporarily opened to a trash-receiving position.

Yet a further object of the invention is to provide a hydraulic control mechanism adapted for use in a trash disposal system operated by an automotive vehicle.

These and other objects and advantages of the invention will become apparent from the following description thereof, and from the accompanying drawings illustrating the same, in which:

FIGURE 1 is a perspective view illustrating how the occupant of an automotive vehicle disposes of trash in accordance with the method of the invention;

FIGURE 2 is a plan view illustrating the preferred arrangement of the trash disposal system of the present invention shown mounted on a service station island;

FIGURE 3 is an elevational view of the trash container utilized in the present disposal system, and the actuation thereof by an automotive wheel;

Figure 5:
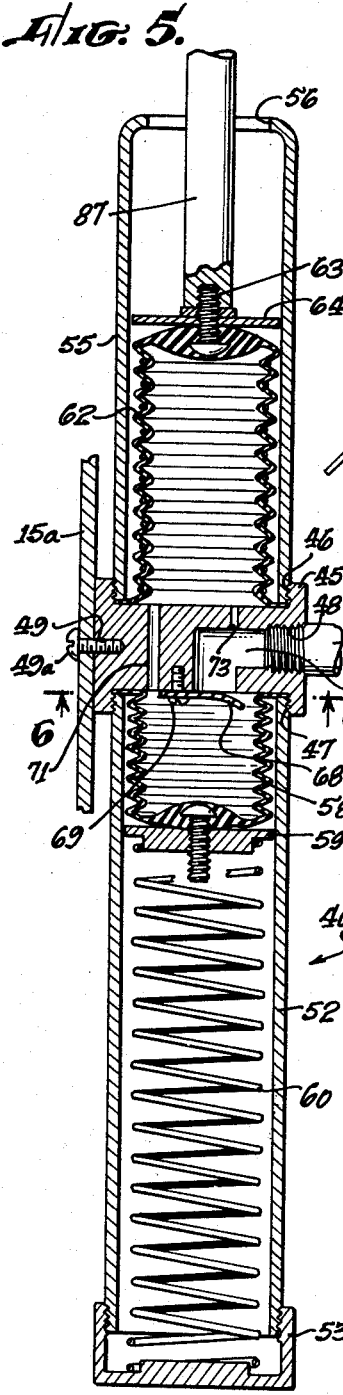
FIGURE 5 is a vertical sectional view of one of the operating mechanisms taken on line 5—5 of FIGURE 4.

The novel method of the present invention is particularly well adapted for service station use and is preferably carried out as follows. First, a trash container is selected which has a pair of normally closed chutes on opposite sides thereof. Second, the container is so placed in a fixed position between a pair of service station approach areas that each of its chutes faces a corresponding one of the approach areas; for example, the container may be placed on a service station island in alignment with a row of gasoline pumps and other conventional equipment. Third, when a vehicle moves into one of the arrival areas, the corresponding chute of the trash container is opened. Fourth, the chute is held open by unique means within the mechanism after the automotive vehicle has passed over the same, and for a sufficient length of time to enable an occupant of the automotive vehicle to dispose of trash by inserting the same via the chute opening into the container. Fifth, the chute is returned to its normal closed position.

It is preferred to carry out the above method by means of automatic equipment which requires no labor on the part of the service station attendant and which also requires no participation by any occupant of the vehicle, other than the act of dropping trash into the container.

With further reference to the drawings which illustrate in detail an automotive trash disposal system that is presently preferred for carrying out the method of the invention, it will be seen to include a trash container T equipped with a pair of chutes 30a, 30b, and a corresponding pair of operating mechanisms 40a, 40b, which actuate the chutes in response to energy supplied by the weight of one of the wheels of the vehicle in passing over one of the means Da or Db. The overall operation of the method is best described in connection with FIGURES 1, 2 and 3. Trash container T is mounted in a service station I in a position such as between a pair of pumps P (FIGURE 2). Energy supplying means Da, Db are disposed on opposite sides of container T and directly in the arrival lanes for automotive vehicles approaching on either side of the service station. Each means Da and Db is placed in such position that it will be run over by one of the wheels of a vehicle as it arrives opposite container T.

Each energy supplying means such as Da includes a resilient bulb 50 defining a confined fluid chamber that is adapted to discharge actuating fluid therefrom when run over by an automotive wheel. A tube 51 is connected to one end of bulb 50 and conveys actuating fluid to the corresponding operating mechanism such as 40a. The application of a pulse of fluid to operating mechanism 40a causes the corresponding chute 30a to be opened and to so remain for a predetermined time interval before returning to its normal closed position.

Figure 4:
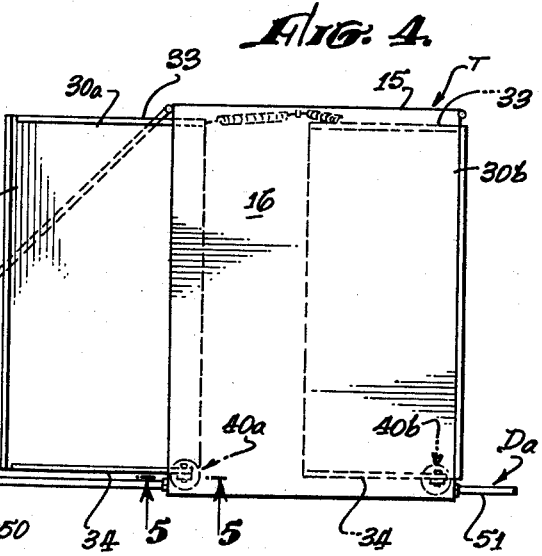
FIGURE 4 is a top plan view of the trash container shown in FIGURE 3.

Referring to FIGURES 3 and 4, container T will be seen to include an elongate hollow metal housing 15 which is rigidly supported in a vertical position. Housing 15 has a closed upper end 16 and a pair of oppositely disposed side openings 17a, 17b. Access openings 18a, 18b are provided in housing 15 so as to permit a trash receptacle to be inserted into or removed from housing 15.

A pair of cover members 20a, 20b are provided for closing the corresponding access openings. Each cover member is supported from the housing by means of appropriate hinges. Housing 15 can, of course, be fabricated in a number of different shapes, but as shown in the drawing is rectangular, with its upper end 16 being flat and the side openings 17a, 17b and access doors 18a, 18b extending substantially the full width of the housing on opposite sides thereof. It is preferred to support the access doors by means of hinges fastened to a vertical corner edge of housing 15, in the manner illustrated.

Chutes 30a, 30b are of a special design which is believed to have a unique value for the purposes of the invention. Each chute includes a substantially flat bottom member 31 which is in a vertical plane when the chute is closed. A plurality of hinges 32 are fastened to the lower horizontal edge of member 31 for supporting the same from a corresponding partial side panel such as 19a of housing 15. Each chute also includes a pair of side flanges 33, 34 that project from corresponding ends of bottom member 31 in a direction substantially normal thereto. Side flanges 33, 34 extend within side openings 17a, 17b into the upper interior portion of housing 15. Side flanges 33, 34 are always aligned in vertical planes, but move inwardly and outwardly with respect to side openings 17a, 17b as the bottom member 31 swings on hinges 32. Immediately beneath the corresponding edge of the closed upper end 16 of housing 15 there is a partial side panel such as 14, the lower edge of which defines the upper edges of side flanges 33, 34 are arcuate and define a distance of fixed radius from hinges 32.

Each chute is adapted to open to an inclined position where its movement is stopped by virtue of upwardly extending ears 33a, 34a provided on the upper corners of the corresponding side flanges. Thus, as the chute is opened, corner ear portion 33a of side flange 33 defines an arcuate path within the upper portion of housing 15, and engages the inner surface of partial side panel 14 for limiting the maximum chute opening.

When each chute is open, it is disposed in a position to conveniently receive trash from the occupant of the vehicle as shown in FIGURE 1. In other words, this type of chute permits trash to be either thrown into the container opening or to slide down the bottom of the chute, as circumstances may dictate. When the chute is open, the side flanges or walls also provide the additional advantage of reducing and possibly eliminating the hazard of having items of trash being blown off course by a sideways wind current. The chute at the same time performs the double function of acting as a lid when in its vertical or closed position.

Each of side flanges 33, 34 has sufficient width at its lower end so that the edge portion thereof which extends inwardly of housing 15 provides a lever arm by means of which the opening and closing of the chute may be actuated. Each operating mechanism 40a, 40b is as may be seen in FIGURE 3 capable of maintaining the corresponding chute in a vertical or closed condition, or of rotating the chute to an open position in which its bottom member is inclined at an angle of less than 90° from the vertical. Each operating mechanism 40a or 40b is actuated by means of a pulse of fluid received from the corresponding resilient bulb 50, as previously explained.

Figure 6:
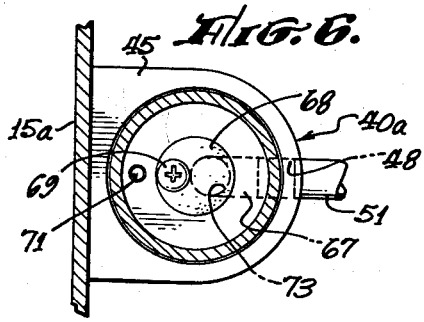
FIGURE 6 is a cross-sectional view of the operating mechanism of FIGURE 5 taken on line 6—6 thereof.

Referring now to FIGURES 5 and 6 for the detailed structure of the operating mechanisms 40a, 40b, it will be seen to include a rigid coupling member 45. Coupling member 45 has a threaded bore 46 formed in its upper end, a threaded bore 47 formed in its lower end, and a threaded bore 48 formed in one side thereof. On its other side, coupling member 45 has threaded bores 49 formed therein that are engaged by screws 49a, by means of which the operating mechanism is rigidly supported from a vertical wall 15a of housing 15.

Threaded bore 47 is engaged by a hollow cylindrical member 52 which projects downwardly in a rigidly supported relationship therewith, member 52 having its lower end exteriorly threaded and closed off by a cap 53. Threaded bore 46 is engaged by a hollow cylindrical member 55 which extends upwardly in a rigidly supported relationship therewith, the upper end of member 55 having a large central opening 56 formed therein. A first bellows-like device 58 occupies the upper end of cylindrical member 52 and its open end extends upwardly in fluid-tight engagement with coupling member 45 around the bottom periphery of threaded bore 47. Device 58 may, for example, comprise a rubber tube fabricated from a longitudinal series of convoluted segments, which is extendible but is normally maintained in a telescoped, non-extended position. The closed lower end of device 58 is fastened to a buffer plate 59 which is adapted to slide longitudinally within the cylinder 52. A helical spring 60 is disposed within the lower end of cylinder 52, with the bottom end thereof engaging the cap 53 whereby its upper end urges the buffer plate 59 upwardly.

A second bellows-like device 62 is disposed within the lower end of rigid cylinder 55, and its open end extends downwardly in fluid-tight engagement with the lower circumferential edge of threaded bore 46. Device 62 may comprise a rubber tube formed of a longitudinal series of convoluted segments, and is extendible but is normally maintained in a non-extended position. The closed upper end of device 62 is fastened by means of a screw 63 to a buffer plate 64, with the buffer plate being longitudinally slidable within rigid cylinder 55. A rigid actuator rod 87 is provided, the lower end of which extends via opening 56 into the upper portion of cylinder 55 where it engages buffer plate 64 and is rigidly fastened thereto by means of screw 63. Each of the chutes 30a, 30b has a cylindrical shell 31a with a closed upper end 31b that is pivotally supported at 31c from the inner end of the chute, as shown in FIGURE 3. The upper end portion of each actuator rod 87 is slidably mounted in one of the shells 31a. As rod 87 moves upwardly, the upper end thereof contacts the inner surface of end 31b, and the chute 30a or 30b with which the rod 87 is associated is pivoted outwardly to a trash-receiving position as shown in FIGURE 1. Two tensioned springs 30c and 30d are connected to the interior portions of chutes 30a and 30b respectively, and at all times tend to pivot the chutes to the closed position of chute 30b shown in FIGURE 2. The ends of springs 30c and 30d opposite those connected to chutes 30a and 30b are affixed to an anchor 30e. Anchor 30e may be a clip, rod, bracket, or the like, affixed to housing 15. Of course, if desired, torsion springs or the like, could be used in lieu of tension springs 30c and 30d.

Coupling 45 has a first passageway 67 formed therein of relatively large cross-sectional area which interconnects threaded bore 48 with threaded bore 47. A resilient flat 68 is positioned underneath coupling member 45 (on the bottom surface of threaded bore 47) so as to normally cover passageway 67, and is rigidly fastened to coupling member 45 at a point adjacent to passageway 67 by means of a screw 69. Therefore, resilient flap 68 operates as a non-return valve which permits the flow of fluid through passageway 67 from opening 48 to opening 47 while inhibiting the flow of fluid in the reverse direction therein.

Coupling member 45 also has a second passageway 71 formed therein providing communication between the lower surface (opening 47) of the coupling member and its upper surface (opening 46). The cross-sectional area of passageway 71 is substantially smaller than that of passageway 67, and therefore presents substantially greater resistance to fluid flow than does passageway 67. In this manner the first bellows-like device 58 serves as an accumulator, since a pulse of fluid supplied via tube 51 and threaded opening 48 is able to enter the device via passageway 67 more rapidly than it is able to escape via passageway 71.

Coupling member 45 also has a third passageway 73 formed therein which provides fluid communication between its upper surface (threaded opening 46) and passageway 67. Passageway 73 is substantially smaller than passageway 71, and consequently presents even greater resistance to fluid flow.

The operation of the hydraulic control mechanism is as follows. A resilient bulb 50 is deformed when an automotive wheel passes thereover, and hydraulic fluid from bulb 50 flows through tube 51 and passageway 67 into the first bellows-like device 58 which serves as an accumulator. As fluid becomes stored in device 58, spring 60 becomes compressed and applies correspondingly increased pressure in the upward direction against the closed lower end of device 58. The fluid received in device 58 cannot flow back through passageway 67 because of the non-return valve action provided by resilient flap 68. The fluid flows through passageway 71 into second bellows-like device 62 for expanding same and correspondingly moving actuator rod 87 in the upward direction.

The accumulator (device 58) acts to convert a relatively short pulse of hydraulic power into a substantially smooth flow of energy extending over a longer period of time. The time required for actuator rod 87 to move upwardly a sufficient distance to fully open the corresponding trash-receiving chute 30a or 30b is therefore appreciable. This time delay is desirable for two reasons. First, it minimizes the possibility of accidental injury to any person who might be standing in the way when the chute starts to open, or who might then be intending to walk through the space which will become occupied by the chute in its open position. Second, the motion of the chute while opening (which may require several seconds) visibly attracts the attention of the occupants of the approaching vehicle, who then finds it easier to stop his car or truck at exactly the right place in order to utilize the trash disposal system.

Passage 73 permits the hydraulic fluid to flow out of device 62 and return whence it came, but the return flow thereof is sufficiently slow that the corresponding trash-receiving chute remains open for a predetermined period of time. The various constants in the hydraulic system are preferably adjusted so that the trash chute will remain open for at least five seconds before re-closing and the re-closing rate is preferably slower than the rate at which the chute opened. It has been found from experience that at least five seconds must be allowed for the average driver in order to give him sufficient time to prepare himself mentally for the task, gather up the trash to be disposed of, and drop it into the chute.

In the operating mechanisms it is not necessary to use an extendible bellows for the accumulator and for the hydraulic actuator; in fact, it may be preferred to use a sliding piston to provide the longitudinally movable element in each hydraulic cylinder. Also, in the accumulator, compressed air may be used as the resilient member in lieu of spring 60.

While only a hydraulic actuating system has been described in which energy is supplied by weight of a moving vehicle, it is apparent that other types of actuation may be used, such as electric or pneumatic. Upon occasion an individual not in an automotive vehicle may wish to actuate one of the chutes 30a or 30b into a trash-receiving position. To permit such movement of chutes 30a or 30b, each chute is provided with a rod 90 that is disposed within housing 15. Each rod 90 is pivotally connected at 31b to the chute 30a or 30b with which it is associated, and by means of a pin 91 to an inwardly disposed lever 92. Lever 92 is pivotally supported on a pin 93 that is affixed to housing 15. Lever 92 projects outwardly from housing 15 and has a pedal 94 mounted thereon that may be operated by foot pressure. When a chute 30a or 30b is operated by foot pressure, no movement of rod 87 takes place, inasmuch as the shell 31a is slidably movable relative thereto.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. A trash disposal apparatus to be used at a service station location and adapted to be actuated by the movement of an automotive vehicle, comprising:

(a) a trash container positioned at said service station location;

(b) a pivotally supported trash guide normally obstructing an opening in said container;

(c) a coupling having first, second and third passages formed therein;

(d) first and second elongate bellows that are disposed on opposite sides of said coupling and sealingly connected thereto;

(e) first and second rigid hollow cylindrical members that are in coaxial alignment and extend outwardly in opposite directions from said coupling, said first and second bellows being slidably movable in said first and second cylindrical members respectively, with said first passage being in communication with the interior of said first bellows, said second passage in communication with the interiors of said first and second bellows, said third passage in communication with the interior of said second bellows and said first passage, which third passage is of substantially lesser transverse cross section than that of said first passage;

(f) first means for supporting said coupling and first and second cylindrical members at fixed positions relative to said trash container, with said second cylindrical member extending upwardly;

(g) second means for movably connecting said second bellows to said trash guide;

(h) a fluid container of variable volume so disposed as to be run over by said automotive vehicle as said vehicle enters said service station location;

(i) a tubular member extending from said container and in communication with said first passage;

(j) a first spring in said first cylindrical member that at all times tends to move said first bellows upwardly to a collapsed position;

(k) a check valve for preventing the flow of fluid back to said first passage after it has passed therefrom into said first bellows; and (l) a second spring of lesser strength than said first spring for at all times tending to move said trash guide to a closed position and said second bellows to at least a partially collapsed position, with said trash guide being pivoted to an open trash-receiving position when said automotive vehicle runs over said container to force a pulse of the fluid therein through said tubular member to said first passage where the major portion of said pulse of fluid flows past said check valve into said first bellows to expand the same downwardly to deform said first spring, with said first spring then moving said first bellows upwardly to discharge said fluid therein through said second passage to longitudinally expand said second bellows and move said trash guide to an open position, said spring thereafter discharging said fluid from said second bellows through said third passage to said first passage from where said fluid can flow back to said container through said tubular member, with said trash guide concurrently moving from said open trash-receiving position to said position where it obstructs said opening as said second bellows is moved by said second spring.

2. A trash disposal apparatus as defined in claim 1 that is also provided with manually operable means for pivoting said guide to said open trash-receiving position.

3. A trash disposal apparatus as defined in claim 2 wherein said manually operable means includes: a lever pivotally supported in the lower portion of said container, with a portion of said lever projecting therefrom; a pedal affixed to the projecting end of said lever; a rod disposed inside said container; first means for pivotally connecting a first end portion of said rod to the inwardly disposed end of said lever; and second means for pivotally connecting a second end portion of said rod to a portion of said guide, with said pedal when a downward force is applied thereto pivoting said lever to move said guide to a trash-receiving position.

4. A trash disposal apparatus to be used at a service station location and adapted to be actuated by the movement and weight of an automotive vehicle comprising: a trash container positioned in said service station location; a pivotally supported trash guide normally obstructing an opening in said container; a first bellows capable of longitudinal movement from a first to a second position; a second bellows capable of longitudinal movement from a first to a second position; a fluid container of variable volume disposed in said service station location in a position to be run over by one of the wheels of said automotive vehicle as said vehicle approaches said apparatus; first fluid passage means extending from said container to said first bellows; second fluid passage means extending from said first bellows to said second bellows; third fluid passage means extending from said second bellows to said first fluid passage; a check valve in said first fluid passage means adjacent its junction with said first bellows; first spring means that at all times tend to return said first bellows to said first position; second spring means that at all times tend to return said second bellows to said first position; rigid means connecting one end of said second bellows to said trash guide; fluid that fills said fluid container and said first passage means when said container is in a non-deformed position, which fluid is discharged from said container through said first passage means and through said check valve into said first bellows when said container is deformed by the weight of said wheel, said fluid when discharged into said first bellows elongating the same and subsequently being discharged therefrom through said second passage means due to the action of said first spring means to elongate said second bellows to pivot said guide to an open position, with said second spring means moving said actuating rod to collapse said second bellows to discharge said fluid from said second bellows through said third fluid passage to permit said guide to return to a closed position and return said fluid to said fluid container.

References Cited in the file of this patent
UNITED STATES PATENTS

| | | |
|---|---|---|
| 1,194,593 | Boland | Aug. 15, 1916 |
| 1,459,317 | Birdsall | June 19, 1923 |
| 1,975,828 | Conklin | Oct. 9, 1934 |
| 2,116,306 | Dziembowski | May 3, 1938 |
| 2,125,122 | Mongiello | July 26, 1938 |
| 2,166,743 | Miller | July 18, 1938 |
| 2,170,677 | Berg | Aug. 22, 1939 |
| 2,187,513 | Evans | Jan. 16, 1940 |
| 2,343,347 | Turner | Mar. 7, 1944 |
| 2,546,433 | Dick | Mar. 27, 1951 |
| 2,842,876 | Chicoine et al. | July 15, 1958 |
| 2,849,728 | Gyllenberg | Sept. 2, 1958 |